US012807007B2

(12) United States Patent
Kim et al.

(10) Patent No.: US 12,807,007 B2
(45) Date of Patent: Nov. 24, 2026

(54) DEVICE AND METHOD FOR CONTROLLING BRAKING WHEN REGENERATIVE BRAKING IS FORCED TO STOP

(71) Applicants: Hyundai Motor Company, Seoul (KR); Kia Corporation, Seoul (KR)

(72) Inventors: Ju Hyun Kim, Hwaseong-Si (KR); Jae Seok Shin, Hwaseong-Si (KR); Buom Sik Shin, Hwaseong-Si (KR); Jae Yeon Lee, Hwaseong-Si (KR); Seung Jun Lee, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 45 days.

(21) Appl. No.: 18/936,157

(22) Filed: Nov. 4, 2024

(65) Prior Publication Data

US 2025/0368051 A1 Dec. 4, 2025

(30) Foreign Application Priority Data

May 30, 2024 (KR) ........................ 10-2024-0070661

(51) Int. Cl.
*B60L 15/20* (2006.01)
*B60L 7/18* (2006.01)
(Continued)

(52) U.S. Cl.
CPC ............ *B60L 15/2027* (2013.01); *B60L 7/18* (2013.01); *B60L 7/26* (2013.01);
(Continued)

(58) Field of Classification Search
CPC .......... B60L 7/10–18; B60L 7/24; B60L 7/26; B60L 15/2027; B60L 2200/36; B60L 2240/16; B60L 2240/26; B60W 30/18127
See application file for complete search history.

(56) References Cited

U.S. PATENT DOCUMENTS

2012/0056470 A1* 3/2012 Kim .................... B60W 10/188
303/3
2020/0164880 A1 5/2020 Cho

FOREIGN PATENT DOCUMENTS

JP 2013-150388 A 8/2013
JP 2015-061450 A 3/2015
(Continued)

OTHER PUBLICATIONS

Kim, KR 20200045267, machine translation. (Year: 2020).*
Urano, JP 2015-186382, machine translation. (Year: 2015).*
Shimizu, JP 2016-130082, machine translation. (Year: 2016).*

*Primary Examiner* — Mark L. Greene
(74) *Attorney, Agent, or Firm* — MORGAN, LEWIS & BOCKIUS LLP

(57) ABSTRACT

A device for controlling vehicle braking includes a regenerative braking stop logic unit forcibly stopping regenerative braking of a vehicle when a battery charge state of the vehicle reaches a battery upper limit charge state during the regenerative braking, a trigger signal generator generating a trigger signal when the vehicle is driving when the regenerative braking is forcibly stopped by the regenerative braking stop logic unit, and a target braking force calculation unit initiating an operation according to the trigger signal, obtaining a converted braking force value based on a regenerative braking force value obtained from a total vehicle braking force value immediately before forced cessation of the regenerative braking, and determining target physical braking force using the converted braking force value.

20 Claims, 15 Drawing Sheets

S510

(51) Int. Cl.
*B60L 7/26* (2006.01)
*B60W 30/18* (2012.01)

(52) U.S. Cl.
CPC .... *B60W 30/18127* (2013.01); *B60L 2200/36* (2013.01); *B60L 2240/16* (2013.01); *B60L 2240/26* (2013.01)

(56) References Cited

FOREIGN PATENT DOCUMENTS

| | | | | | |
|---|---|---|---|---|---|
| JP | 2015186382 | A | * | 10/2015 | |
| JP | 2016130082 | A | * | 7/2016 | |
| JP | 2019-205272 | A | | 11/2019 | |
| JP | 2022-060788 | A | | 4/2022 | |
| JP | 2023-017345 | A | | 2/2023 | |
| KR | 10-1156133 | B1 | | 6/2012 | |
| KR | 10-2020 0054512 | A | | 5/2020 | |
| KR | 20200045267 | A | * | 5/2020 | .............. B60L 58/21 |
| KR | 10-2021-0156392 | A | | 12/2021 | |
| KR | 10-2621532 | B1 | | 1/2024 | |

* cited by examiner

REGENERATIVE BRAKING AMOUNT DISTRIBUTION RATIO INFORMATION
<FIRST AND SECOND COMMON MODES>

| Mgsinθ / DECELERATION | 1 | 20 | 30 | 40 | 50 | 60 | 70 |
|---|---|---|---|---|---|---|---|
| 1 | BFC11 | · | · | BFC14 | · | · | BFC17 |
| 20 | · | | | · | | | · |
| 30 | · | | | · | | | · |
| 40 | BFC41 | · | · | BFC44 | · | · | BFC47 |
| 50 | · | | | · | | | · |
| 60 | · | | | · | | | · |
| 70 | BFC71 | · | · | BFC74 | · | · | BFC77 |

BRAKING FORCE CORRECTION VALUE(BFC) TABLE

FIG. 5B

| | | | | | | | |
|---|---|---|---|---|---|---|---|
| TOTAL BRAKING FORCE VALUE (TBF) | 100 | 500 | 1000 | 1500 | 2000 | 3000 | 4000 |
| AUXILIARY BRAKING FORCE VALUE (N/m) | 10 | 20 | 50 | 80 | 100 | 100 | 100 |

RATIO INFORMATION OF AUXILIARY BRAKING AMOUNT

FIG. 7

DEVICE AND METHOD FOR CONTROLLING BRAKING WHEN REGENERATIVE BRAKING IS FORCED TO STOP

CROSS-REFERENCE TO RELATED APPLICATION(S)

The present application claims priority to Korean Patent Application No. Application No. 10-2024-0070661 filed on May 30, 2024, the entire contents of which is incorporated herein for all purposes by this reference.

BACKGROUND OF THE PRESENT DISCLOSURE

Field of the Present Disclosure

The present disclosure relates to a device and method for controlling vehicle braking in which braking force may be maintained when regenerative braking is forced to stop to prevent overcharging of a vehicle.

Description of Related Art

Generally, in vehicles such as commercial vehicles, regenerative braking or the like utilizes inertial force generated when a motor (an electric motor) moving by torque force is in a closed loop state to turn the rotor on the wheel or the like to operate the motor as a generator. Accordingly, braking power may be exerted using electrical energy recovered by converting kinetic energy.

Additionally, electric vehicles (electric cars) use regenerative braking technology to charge the batteries thereof while driving. Such regenerative braking may generally be set to 1, 2, 3 levels and one-pedal mode depending on regenerative braking force. For instance, battery braking control may use a regenerative braking stop logic operating to forcibly stop (escape) regenerative braking, when a battery reaches a 100% State of Charge (SOC), which is an upper limit of battery charge, considering battery capacity, while regenerative braking is being used.

However, in existing battery braking control, for example, while a vehicle is driving while using regenerative braking on a downhill road, if 100% SOC is reached and regenerative braking is suddenly stopped to prevent battery overcharging, in the case of electric vehicles, a problem may occur in which braking power is lost momentarily and vehicle speed increases rapidly on a downhill road. Additionally, in the case of large commercial vehicles, if braking power is suddenly lost on a downhill road, the speed rapidly increases due to the weight of a commercial vehicle, increasing risk of an accident.

In detail, when the regenerative braking force is adjusted by a pedal opening rate while one-pedal or i-pedal mode is used, the battery charge state reaches the battery upper limit SOC value and regenerative braking is disabled. Furthermore, when a battery charge state reaches the battery upper limit SOC value and regenerative braking is disabled, there may be a problem in that a dangerous situation may occur in which the vehicle accelerates downhill as a pedal value is immediately transmitted to accelerate.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a device and method for controlling vehicle braking in which braking force may be continuously maintained in response that regenerative braking is forced to stop to prevent overcharging of a vehicle.

According to an aspect of the present disclosure, a device for controlling vehicle braking includes a regenerative braking stop logic unit forcibly stopping regenerative braking of a vehicle in response that a battery charge state of the vehicle reaches a battery upper limit charge state during the regenerative braking; a trigger signal generator generating a trigger signal in response that the vehicle is driving in response that the regenerative braking is forcibly stopped by the regenerative braking stop logic unit; and a target braking force calculation unit initiating an operation according to the trigger signal, obtaining a converted braking force value based on a regenerative braking force value obtained from a total braking force value of the vehicle immediately before forced cessation of the regenerative braking, and determining target physical braking force using the converted braking force value.

The target braking force calculation unit may be configured to further include a regenerative braking force calculation unit obtaining the regenerative braking force value from total braking force value of the vehicle immediately before the forced cessation of the regenerative braking, based on a regenerative braking type immediately before the forced cessation of the regenerative braking, to reflect the regenerative braking force value in the target physical braking force.

The regenerative braking force calculation unit may include a regenerative braking type recognition unit recognizing which mode the regenerative braking type is, from among a regenerative braking single mode in which the vehicle is only in a regenerative braking state, a first common mode in which the regenerative braking and physical braking are used together, and a second common mode with cruise braking.

The regenerative braking force calculation unit may include a regenerative braking force acquisition unit obtaining the regenerative braking force value immediately before the forced cessation of the regenerative braking based on preset regenerative braking amount distribution ratio information in response that the regenerative braking type is one of the first common mode and the second common mode.

The regenerative braking force calculation unit may be configured to further include a proportional integral controller performing proportional integral control on the regenerative braking force value, for reflection in the target physical braking force.

The target braking force calculation unit may be configured to further include a first correction value calculation unit determining a braking force correction value based on an attitude, a weight and deceleration of the vehicle, for reflection in the target physical braking force.

The target braking force calculation unit may be configured to further include a target physical braking force calculation unit obtaining the converted braking force value using the regenerative braking force and the braking force correction value and determining target physical braking force based on the converted braking force value.

The target braking force calculation unit may be configured to further include a second correction value calculation unit obtaining an auxiliary braking force value based on the total braking force value of the vehicle immediately before the forced cessation of the regenerative braking to reflect the auxiliary braking force value in the target physical braking force, in response that auxiliary braking is used immediately before the forced cessation of the regenerative braking.

The target braking force calculation unit may be configured to further include a pedal logic unit setting a driver pedal value to a zero value to prevent physical acceleration due to the driver pedal value in response that the driver pedal value immediately before the forced cessation of the regenerative braking exceeds the zero value.

The second correction value calculation unit may be configured to obtain an auxiliary braking force value to reflect the auxiliary braking force value in the target physical braking force, based on ratio information of an auxiliary braking amount to the total braking force value of the vehicle immediately before the forced cessation of the regenerative braking.

According to an aspect of the present disclosure, a method for controlling vehicle braking includes a regenerative braking stop operation of forcibly stopping regenerative braking of a vehicle in response that a battery charge state of a vehicle reaches a battery upper limit charge state, during regenerative braking of the vehicle; a trigger signal generation operation of generating a trigger signal in response that the vehicle is driving while the regenerative braking is forcibly stopped; and a target braking force determination operation of initiating operation according to the trigger signal, obtaining a converted braking force value based on a regenerative braking force value obtained from a total braking force value of the vehicle immediately before the forced cessation of the regenerative braking, and determining target physical braking force using the converted braking force value.

The target braking force determination operation may be configured to further include a regenerative braking force determination operation of obtaining the regenerative braking force value from total braking force value of the vehicle immediately before the forced cessation of the regenerative braking, based on a regenerative braking type immediately before the forced cessation of the regenerative braking, to reflect the regenerative braking force value in the target physical braking force.

The target braking force determination operation may be configured to further include a first correction value determination operation of determining a braking force correction value based on an attitude, a weight and deceleration of the vehicle to reflect the braking force correction value in the target physical braking force.

The target braking force determination operation may be configured to further include a target physical braking force determination operation of determining the converted braking force value using the regenerative braking force and the braking force correction value, and determining target physical braking force based on the converted braking force value.

The regenerative braking force determination operation may include a regenerative braking type recognition operation of recognizing which mode the regenerative braking type is, from among a regenerative braking single mode in which the vehicle is in a regenerative braking state, a first common mode in which regenerative braking and physical braking are used together, and a second mode in a cruise braking state.

The regenerative braking force determination operation may include a regenerative braking force value acquisition operation of obtaining the regenerative braking force value RBF immediately before the forced cessation of the regenerative braking based on preset regenerative braking amount distribution ratio information, in response that the regenerative braking type is one of the first common mode and the second common mode.

The regenerative braking force determination operation may be configured to further include a proportional integral control operation of performing proportional integral control on the regenerative braking force, for reflection in the target physical braking force.

The target braking force determination operation may be configured to further include a second correction value determination operation of obtaining an auxiliary braking force value based on the total braking force value of the vehicle immediately before the forced cessation of the regenerative braking to reflect the auxiliary braking force value in the target physical braking force, in response that auxiliary braking is used immediately before the forced cessation of the regenerative braking.

The second correction value determination operation may be configured to obtain an auxiliary braking force value to be reflected in the target physical braking force, based on ratio information of an auxiliary braking amount to a total braking force value of the vehicle immediately before the forced cessation of the regenerative braking.

The target braking force determination operation may be configured to further include a pedal logic operation of setting a driver pedal value to a zero value to prevent physical acceleration due to the driver pedal value in response that the driver pedal value immediately before the forced cessation of the regenerative braking exceeds the zero value.

Furthermore, aspects of the present disclosure are not limited to the aspects exemplified above, and other aspects may be additionally understood in the process described below.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5B is a table diagram illustrating an example of a braking force correction value.

FIG. 7 is a table diagram illustrating an example of auxiliary braking amount ratio information.

Figure 1:
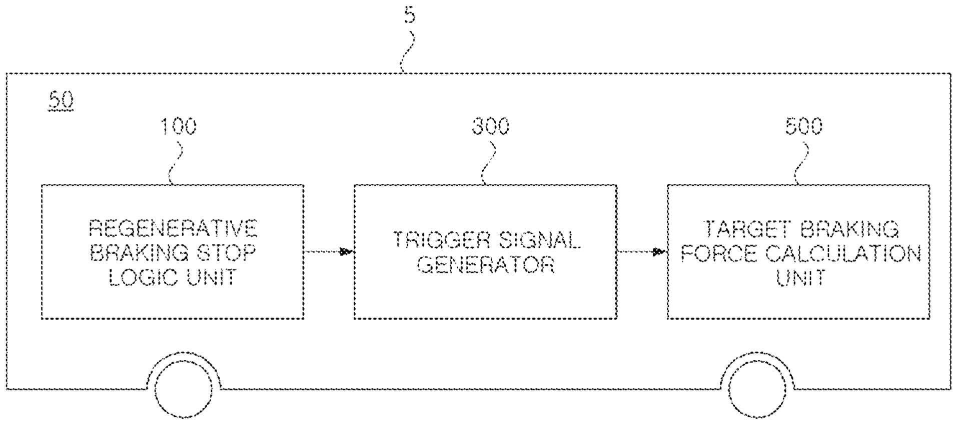
FIG. 1 is an illustrative block diagram of a device for controlling vehicle braking according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, detailed embodiments will be described with reference to the drawings. The detailed description below is provided to facilitate a comprehensive understanding of the methods, devices and/or systems described herein. However, this is only an example and the present disclosure is not limited thereto.

In describing embodiments, detailed descriptions of known technologies related to the present disclosure will be omitted if it is judged that such detailed descriptions may unnecessarily obscure the gist of the present disclosure. The terms described below are defined in consideration of the functions in the present disclosure, and may vary depending on the intention or custom of the user or operator. Therefore, the definition should be made based on the contents throughout this specification. The terminology used in the detailed description is only for describing embodiments and should not be limiting. Unless explicitly stated otherwise, expressions in the singular form include the meaning in the plural form. In this description, expressions such as "including" or "provided" are intended to indicate certain features, numbers, operations, operations, elements, parts or combinations thereof, and it should not be construed to exclude the existence or possibility of one or more other features, numbers, operations, operations, elements, or parts or combinations thereof, other than those described.

Hereinafter, various exemplary embodiments will be described in more detail with reference to the appended drawings.

FIG. 1 is an illustrative block diagram of a device for controlling vehicle braking according to an exemplary embodiment of the present disclosure.

Referring to FIG. 1, a device 50 for controlling vehicle braking according to various exemplary embodiments of the present disclosure may be mounted in a vehicle 5 such as a commercial vehicle, and may include a regenerative braking stop logic unit 100, a trigger signal generator 300, and a target braking force calculation unit 500.

The regenerative braking stop logic unit 100 may forcibly stop regenerative braking when the battery state of charge (SOCd) of the vehicle 5 reaches the battery upper limit state of charge (SOCh) during regenerative braking. For example, information regarding the battery state of charge (SOCd) of the vehicle 5 may be received from the battery device of the vehicle 5. The battery upper limit state of charge (SOCh) may be 100% SOC value, but may not be exactly 100% SOC value and may be set to include a slight tolerance. For example, when the regenerative braking stop logic unit 100 forcibly stops regenerative braking to prevent an overcharge state, the vehicle 5 traveling downhill has its brakes momentarily released and the regenerative braking amount is recognized as an overspeed physical quantity. Therefore, to prevent the problem of further speeding on a downhill road, the trigger signal generator 300 and the target braking force calculation unit 500 need to be operated.

The trigger signal generator 300 may be configured to generate a trigger signal ST when the vehicle 5 is driving when the regenerative braking is forced to stop by the regenerative braking stop logic unit 100. For example, when regenerative braking is stopped due to the operation of the regenerative braking stop logic unit 100 while the vehicle 5 is driving, the level of the trigger signal ST may transition from a low level to a high level. In contrast, when regenerative braking is stopped, the level of the trigger signal ST may transition from a high level to a low level. In the instant case, the level of the trigger signal ST may be a voltage level, but is not limited thereto.

The target braking force calculation unit 500 may start operation according to the trigger signal ST, obtain a converted braking force value based on the regenerative braking force value RBF obtained from the total vehicle braking force value TBF immediately before the forced cessation of the regenerative braking, and determine the target physical braking force TPBF using the converted braking force value. For example, the total braking force value TBF of the vehicle may be a total regenerative braking amount or may be partially a regenerative braking amount. For example, when the total braking force value TBF of the vehicle is a total regenerative braking amount, the total regenerative braking amount may be converted to the physical braking amount, and when the total braking force value TBF of the vehicle is partially a regenerative braking amount, the regenerative braking amount may be partially converted to the physical braking amount.

In an exemplary embodiment of the present disclosure, the regenerative braking stop logic unit 100, the trigger signal generator 300, and the target braking force calculation unit 500 may respectively be implemented as separate processors, or the regenerative braking stop logic unit 100, the trigger signal generator 300, and the target braking force calculation unit 500 may be implemented with one processor and do not need to be limited to any one.

Furthermore, the regenerative braking stop logic unit 100, the trigger signal generator 300, and the target braking force calculation unit 500 may be respectively implemented as hardware element(s) or software element(s) or a combination thereof in at least one integrated circuit (IC) embedded in the battery management device, and the present disclosure is not particularly limited to any one.

For respective drawings of the present disclosure, unnecessary redundant descriptions of components with the same symbols and the same function may be omitted, and possible differences between the drawings may be described.

Figure 2:
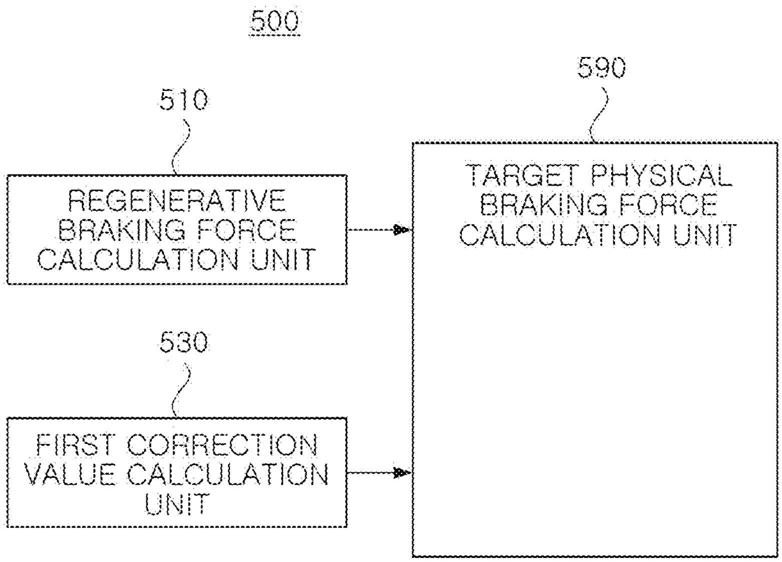
FIG. 2 is an example diagram of a target braking force calculation unit.

FIG. 2 is an example diagram of the target braking force calculation unit.

Referring to FIG. 2, the target braking force calculation unit 500 may include a regenerative braking force calculation unit 510, a first correction value calculation unit 530, and a target physical braking force calculation unit 590.

The regenerative braking force calculation unit 510 may obtain the regenerative braking force value RBF from the total vehicle braking force value TBF immediately before the forced cessation of the regenerative braking, based on the regenerative braking type immediately before the forced cessation of the regenerative braking, for reflection in the target physical braking force TPBF. For example, regenerative braking types may be distinguished depending on the ratio of the total braking amount, using regenerative braking, which will be described below.

The first correction value calculation unit 530 may be configured to determine braking force correction value BFC based on the attitude sin θ, weight M, and deceleration ($m/s^2$) of the vehicle 5, for reflection in the target physical braking force TPBF. For example, the 'sin θ' value may be determined depending on the attitude of the vehicle 5, for example, the inclination angle θ of the inclined road, which may be received from a sensor which is configured to detect slope information, such as a navigation terminal, or from the vehicle's electronic control unit (ECU). The weight M of the vehicle may be received from the vehicle's weight sensor or the vehicle's electronic control unit (ECU). Deceleration ($m/s^2$) information may be received from a sensor which is configured to detect changes in vehicle speed, the vehicle's electronic control unit (ECU), or the vehicle control unit (VCU).

The target physical braking force calculation unit 590 may obtain the converted braking force value using the regenerative braking force value RBF and the braking force correction value BFC, and determine the target physical braking force TPBF based on the converted braking force value. For example, the converted braking force value may be a conversion target braking force value related to regenerative braking force for conversion to a physical braking amount.

Figure 3:
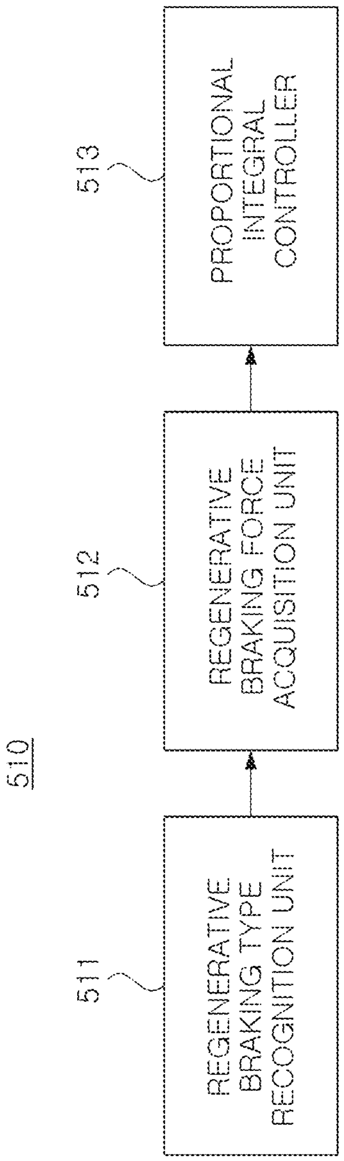
FIG. 3 is an illustrative diagram of a regenerative braking force calculation unit.

FIG. 3 is an example diagram of a regenerative braking force calculation unit 510.

Referring to FIG. 3, the regenerative braking force calculation unit 510 may include a regenerative braking type recognition unit 511, a regenerative braking force acquisition unit 512, and a proportional integral controller 513.

The regenerative braking type recognition unit 511 may recognize which mode the regenerative braking type is, from among regenerative braking single mode in which the vehicle 5 is only in regenerative braking, a first common mode in which regenerative braking and physical braking are used together, and a second common mode with cruise braking. For example, in the regenerative braking single mode, the total braking amount corresponds to the regenerative braking amount, and in the first common mode and the second common mode, part of the total braking amount may be regenerative braking amount, and the remaining part may be physical braking amount.

When the regenerative braking type is one of the first common mode and the second common mode, the regenerative braking force acquisition unit 512 may obtain the regenerative braking force value RBF immediately before the forced cessation of the regenerative braking, based on preset regenerative braking amount distribution ratio information. For example, the regenerative braking amount distribution ratio information is information regarding the distribution ratio of the regenerative braking amount and the physical braking amount with respect to the total braking amount, and if the total braking amount is known using the present information, the regenerative braking amount at that time may be known. As an exemplary embodiment of the present disclosure, regenerative braking type information and total braking amount information may be received from an electronic control unit (ECU) or a vehicle control unit (VCU) of the vehicle 5.

The proportional integral controller 513 may perform proportional integral control on the regenerative braking force value RBF, for reflection in the target physical braking force TPBF. For example, the proportional integral controller 513 may use any one of the generally known proportional integral controllers, and as an exemplary embodiment of the present disclosure, the proportional integral controller 513 may output an output value close to the target value by applying preset proportional gain and integral gain with respect to the error values between the output value and the target value, respectively. According to the present proportional integral controller 513, the output value may approach the target value more smoothly, ultimately enabling soft control.

Figure 4:
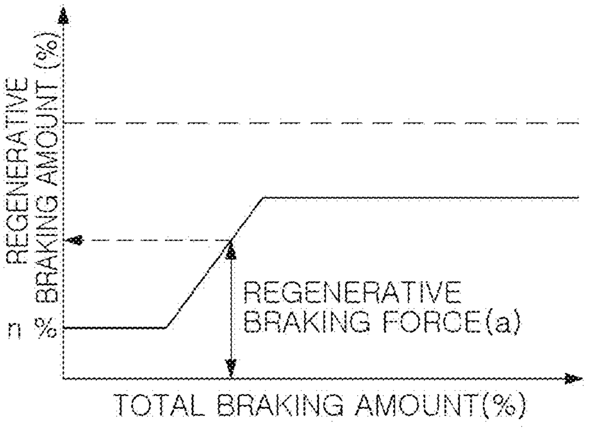
FIG. 4 is a graph illustrating regenerative braking amount distribution ratios for first and second common modes.

FIG. 4 is a graph illustrating the regenerative braking amount distribution ratio for the first and second common modes.

The graph illustrated in FIG. 4 is a graph of regenerative braking amount distribution ratio information related to the first common mode and the second common mode, and referring to the graph illustrated in FIG. 4, the ratio of the regenerative braking amount to the total braking amount may be known.

Figure 5A:
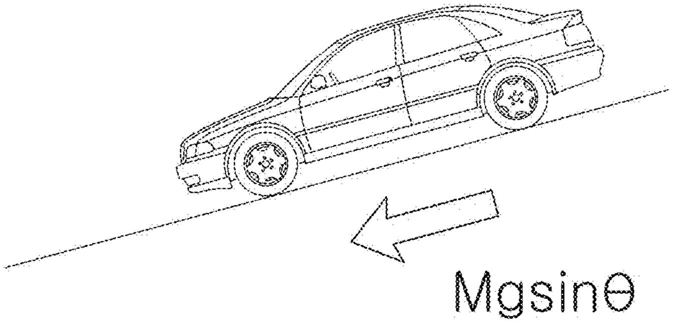
FIG. 5A is a diagram of a vehicle attitude.

FIG. 5A is a diagram of the vehicle attitude, and FIG. 5B is a table diagram illustrating an example of the braking force correction value.

Referring to FIG. 5A, when the vehicle 5 is in a driving position along a downhill road, it may be seen that the force (F=Mg sin θ) [Nm] when the vehicle 5 is traveling along a downhill road with an inclination angle θ is determined by weight M and attitude sin θ, assuming that the gravitational acceleration g is a constant.

For example, the braking force correction value may be determined by considering the vehicle attitude and vehicle weight and the acceleration of the vehicle on a downhill slope. For example, according to the laws of physics, when going downhill, a vehicle receives a force of 'mg sin θ', and correction values for braking force may be obtained using physical formulas. Furthermore, the braking force correction value may be determined by considering the deceleration $m/s^2$ in a braking situation or the case of a vehicle moving at constant acceleration when going downhill.

For example, if the vehicle attitude is steeply downhill or the vehicle weight is heavy (especially commercial trucks), additional physical braking force is applied so that the vehicle may safely move on to the next driving cycle when the regenerative braking force is stopped.

The table illustrated in FIG. 5B illustrates the braking force correction value BFC determined according to the deceleration m/s$^2$, weight M, and attitude sin θ of the vehicle 5.

For example, referring to the table illustrated in FIG. 5B, when the downhill gradient (vehicle attitude) is relatively large and the vehicle weighs a lot, and thus, when converting regenerative braking into physical braking by applying a high correction value, correction values may be reflected to ensure drivability and safety. Referring to the table illustrated in FIG. 5B, correction values when using the auxiliary brake by utilizing the auxiliary brake of a commercial vehicle may be added to ensure drivability and safety.

Referring to the table illustrated in FIG. 5B, it may be seen that the first correction value calculation unit 530 may determine the braking force correction value BFC according to the deceleration and 'Mg sin θ'. For example, when the deceleration m/s$^2$ is 1 and 'Mg sin θ' is 1, the braking force correction value BFC may be BFC11. For example, when the deceleration m/s$^2$ is 40 and 'Mg sin θ' is 40, the braking force correction value BFC may be BFC44. For example, when the deceleration m/s$^2$ is 70 and 'Mg sin θ' is 70, the braking force correction value BFC may be BFC77.

Figure 6:
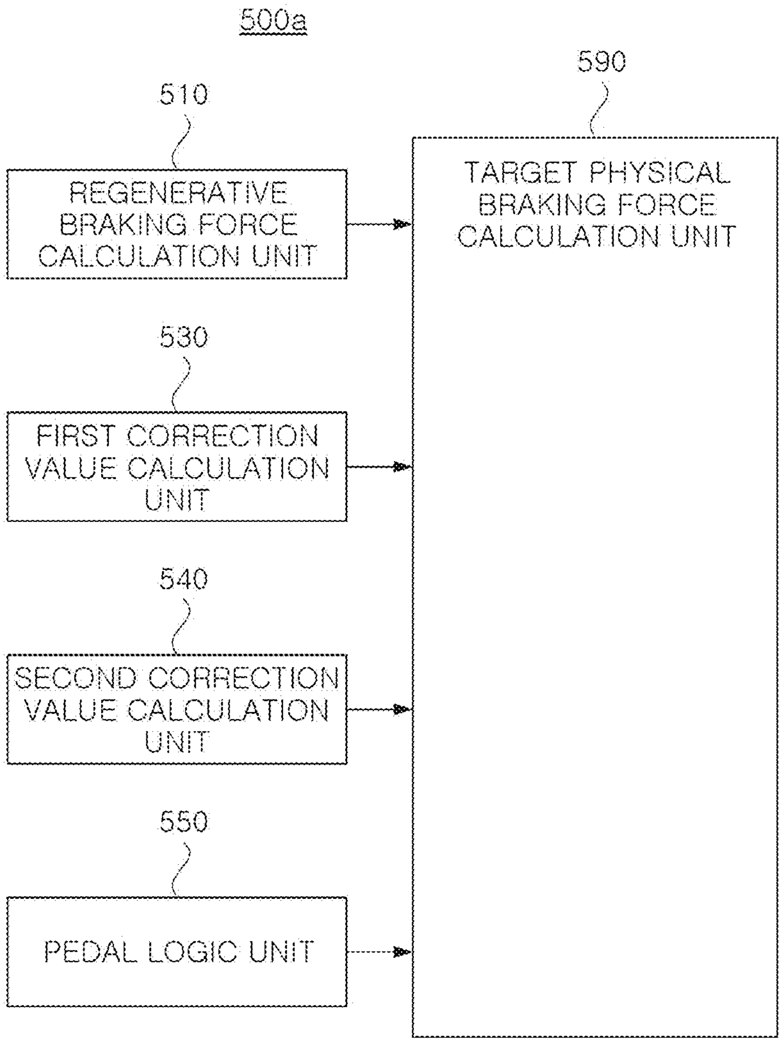
FIG. 6 is another example diagram of a target braking force calculation unit.

FIG. 6 is another example diagram of a target braking force calculation unit.

A target braking force calculation unit 500*a* illustrated in FIG. 6 may additionally include a second correction value calculation unit 540 and a pedal logic unit 550 in addition to the target braking force calculation unit 500 illustrated in FIG. 2. In the instant case, the pedal is a foot brake pedal.

On the other hand, in an exemplary embodiment of the present disclosure, when the target braking force calculation unit 500 of FIG. 2 or the target braking force calculation unit 500*a* of FIG. 6 is not specifically mentioned, the target braking force calculation unit 500 may refer to any one of the target braking force calculation unit 500 of FIG. 2 and the target braking force calculation unit 500*a* of FIG. 6.

Referring to FIG. 6, for example, when auxiliary braking is used immediately before the forced cessation of regenerative braking, the second correction value calculation unit 540 may obtain an auxiliary braking force value based on the total braking force value TBF of the vehicle immediately before the forced cessation of the regenerative braking, for reflection in the target physical braking force TPBF. For example, usage information regarding auxiliary braking may be received from the electronic control unit (ECU) or vehicle control unit (VCU) of the vehicle 5, and the auxiliary braking force value based on the total braking force value TBF of the vehicle will be described with reference to FIG. 7.

For example, when the driver pedal value DPV immediately before the forced cessation of regenerative braking exceeds zero, the pedal logic unit 550 may set the driver pedal value DPV to a zero value to prevent physical acceleration due to the driver pedal value DPV. For example, the total braking force value TBF of the vehicle may be received from an electronic control unit (ECU) or a vehicle control unit (VCU) of the vehicle 5.

FIG. 7 is a table illustrating an example of auxiliary braking amount ratio information.

Referring to FIG. 7, based on the ratio information of the auxiliary braking amount to the total braking force value TBF of the vehicle immediately before the forced cessation of the regenerative braking, the second correction value calculation unit 540 may obtain an auxiliary braking force value ABF for reflection in the target physical braking force TPBF.

Next, a method for controlling vehicle braking force will be described with reference to FIG. 8, FIG. 9, FIG. 10 and FIG. 11. In an exemplary embodiment of the present disclosure, the description of the method for controlling vehicle braking and the description of the device for controlling vehicle braking may complement or be commonly applied to each other, unless there are mutually exclusive circumstances. Accordingly, overlapping descriptions may be omitted. Below, the main processes of controlling vehicle braking force are described.

Figure 8:
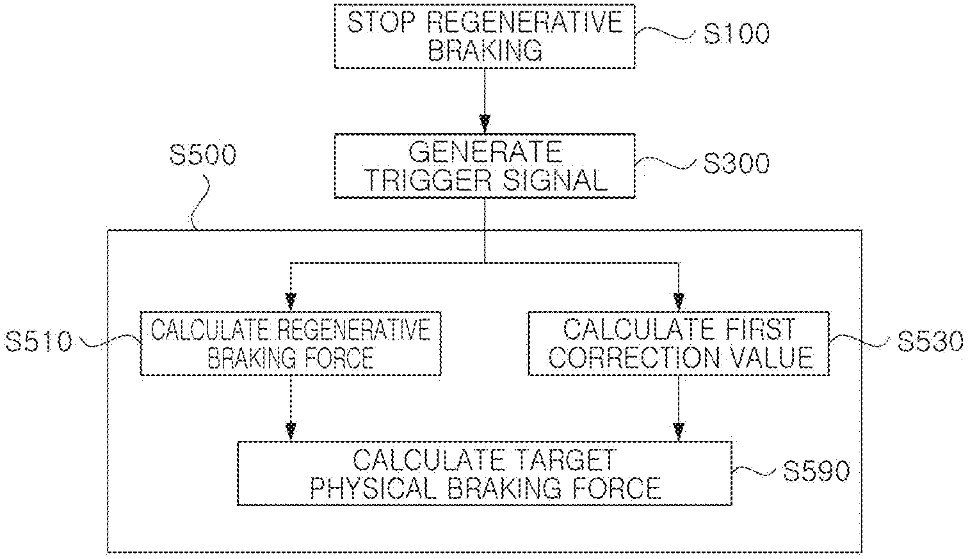
FIG. 8 is a flowchart illustrating a method for controlling vehicle braking according to an exemplary embodiment of the present disclosure.

FIG. 8 is a flowchart illustrating a method for controlling vehicle braking according to an exemplary embodiment of the present disclosure.

Referring to FIGS. 1 and 8, the method for controlling vehicle braking according to various exemplary embodiments of the present disclosure may be performed, for example, by the device 50 for controlling vehicle braking, but the present disclosure is not limited thereto.

The method for controlling vehicle braking may include a regenerative braking stop operation (S100), a trigger signal generation operation (S300), and a target braking force determining operation (S500).

In the regenerative braking stop operation (S100), the device 50 for controlling vehicle braking may forcibly stop regenerative braking when the battery state of charge (SOCd) of the vehicle 5 reaches the battery upper limit state of charge (SOCh) during regenerative braking.

In the trigger signal generation operation (S300), the device 50 for controlling vehicle braking may be configured to generate a trigger signal ST when the vehicle 5 is driving while the regenerative braking is forcibly stopped.

In the target braking force determination operation (S500), the device 50 for controlling vehicle braking may start operation according to the trigger signal ST, obtain a converted braking force value based on the regenerative braking force value RBF obtained from the total braking force value TBF of the vehicle immediately before the forced cessation of the regenerative braking, and determine the target physical braking force TPBF using the converted braking force value.

The target braking force determination operation (S500) may include a regenerative braking force determination operation (S510), a first correction value determination operation (S530), and a target physical braking force determination operation (S590).

In the regenerative braking force determination operation (S510), for reflection in the target physical braking force TPBF, the device 50 for controlling vehicle braking may obtain the regenerative braking force value RBF from the total braking force value TBF of the vehicle immediately before the forced cessation of the regenerative braking, based on the regenerative braking type immediately before the forced cessation of the regenerative braking.

In the first correction value determination operation (S530), the device 50 for controlling vehicle braking may be configured to determine the braking force correction value BFC based on the attitude sin θ, weight M, and deceleration (m/s$^2$) of the vehicle 5, for reflection in the target physical braking force TPBF.

In the target physical braking force determination operation (S590), the device 50 for controlling vehicle braking may obtain the converted braking force value using the regenerative braking force value RBF and the braking force correction value BFC, and determine the target physical braking force TPBF based on the converted braking force value.

Figure 9:
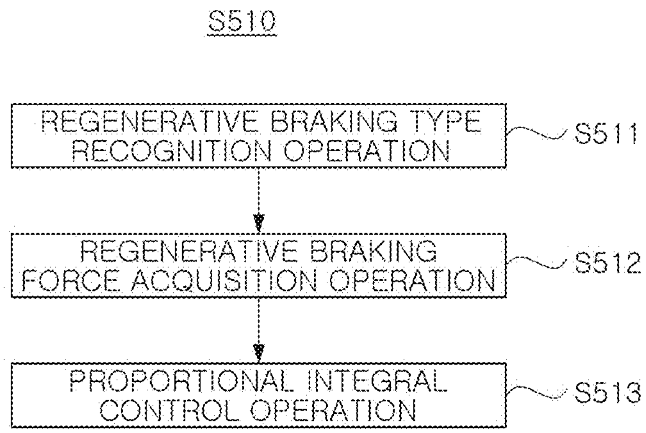
FIG. 9 is an example diagram of a regenerative braking force determination operation.

FIG. 9 is an example diagram of the regenerative braking force determination operation.

Referring to FIG. 9, the regenerative braking force determination operation (S510) may include a regenerative braking type recognition operation (S511), a regenerative braking force value acquisition operation (S512), and a proportional integral control operation (S513).

In the regenerative braking type recognition operation (S511), the device 50 for controlling vehicle braking may recognize which mode the regenerative braking type is, from among the regenerative braking single mode in which the vehicle 5 is in a regenerative braking state, a first common mode in which regenerative braking and physical braking are used together, and a second common mode in which the vehicle 5 is in a cruise braking state.

In the regenerative braking force value acquisition operation (S512), when the regenerative braking type is one of the first common mode and the second common mode, the device 50 for controlling vehicle braking may obtain the regenerative braking force value RBF immediately before the forced cessation of the regenerative braking, based on preset regenerative braking amount distribution ratio information.

Furthermore, in the proportional integral control operation (S513), the device 50 for controlling vehicle braking may perform proportional integral control on the regenerative braking force value RBF, for reflection in the target physical braking force TPBF.

Figure 10:
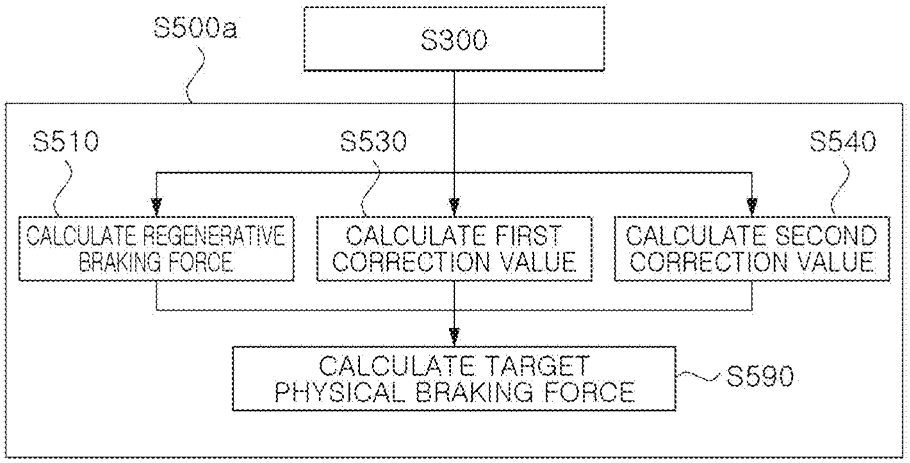
FIG. 10 is an example diagram of a target braking force determination operation.

FIG. 10 is an example diagram of the target braking force determination operation.

A target braking force determination operation (S500*a*) illustrated in FIG. 10 may further include a second correction value determination operation (S540) in addition to the target braking force determination operation (S500) illustrated in FIG. 8.

In the second correction value determination operation (S540), when auxiliary braking is used immediately before the forced cessation of the regenerative braking, the device 50 for controlling vehicle braking may obtain an auxiliary braking force value, based on the total braking force value TBF of the vehicle immediately before the forced cessation of the regenerative braking, for reflection in the target physical braking force TPBF.

Additionally, in the second correction value determination operation (S540), for reflection in the target physical braking force TPBF, the device 50 for controlling vehicle braking may obtain an auxiliary braking force value ABF based on the ratio information of the auxiliary braking amount to the total braking force value TBF of the vehicle immediately before the forced cessation of the regenerative braking.

Figure 11:
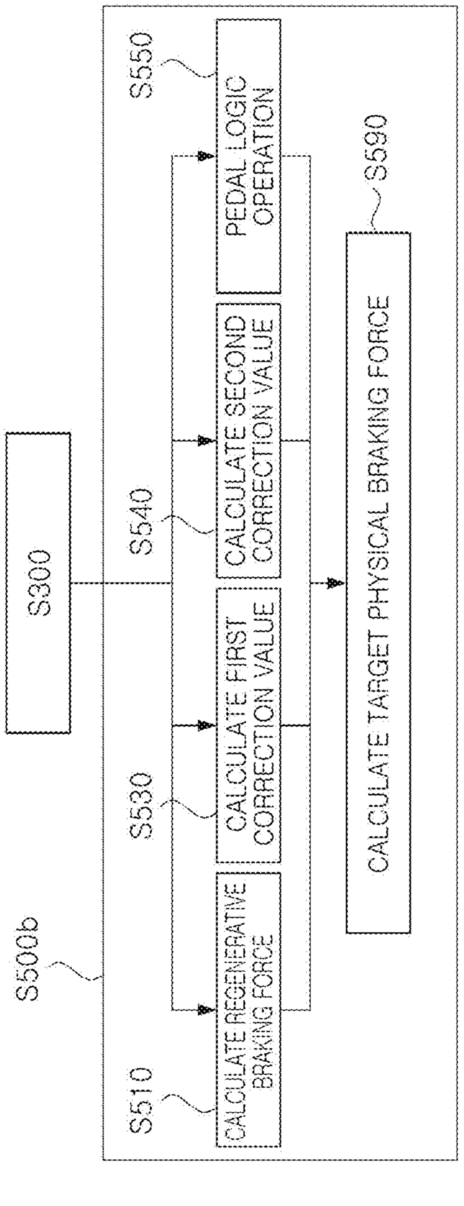
FIG. 11 is another example diagram of a target braking force determination operation.

FIG. 11 is another example diagram of the target braking force determination operation.

A target braking force determination operation (S500*b*) illustrated in FIG. 11 may further include a pedal logic operation (S550) in addition to the target braking force determination operation (S500*a*) illustrated in FIG. 10.

In the pedal logic operation (S550), when the driver pedal value DPV immediately before the forced cessation of regenerative braking exceeds zero, the device 50 for controlling vehicle braking may set the driver pedal value DPV to a zero value to prevent physical acceleration due to the driver pedal value DPV.

On the other hand, in an exemplary embodiment of the present disclosure, for the target braking force determination operation (S500) of FIG. 8, the target braking force determination operation (S500*a*) of FIG. 10, or the target braking force determination operation (S500*b*) of FIG. 11, unless specifically stated, the target braking force determination operation (S500) may refer to any one of the target braking force determination operation (S500) of FIG. 8, the target braking force determination operation (S500*a*) of FIG. 10, and the target braking force determination operation (S500*b*) of FIG. 11.

Figure 12:
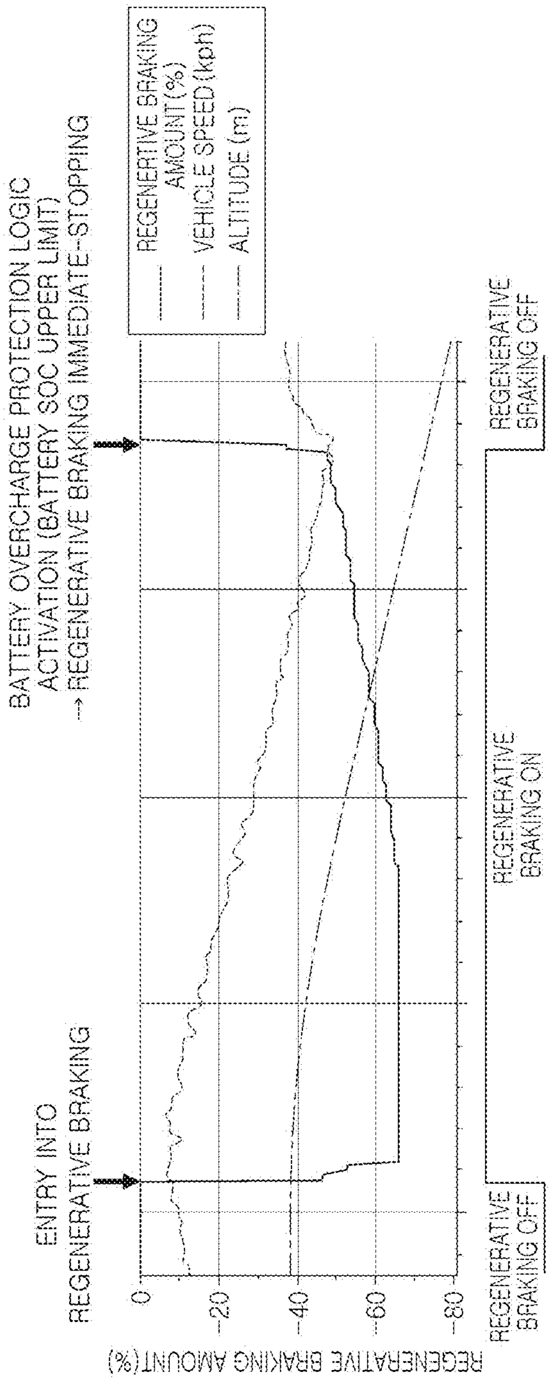
FIG. 12 is an explanatory diagram of regenerative braking amount and vehicle speed according to regenerative braking on or off when the present disclosure is not applied.

FIG. 12 is an explanatory diagram of the regenerative braking amount and vehicle speed according to regenerative braking on or off when the present disclosure is not applied.

Referring to FIG. 12, in the case in which the present disclosure is not applied, when regenerative braking is turned on, the amount of regenerative braking may increase, the altitude may decrease, and the vehicle speed kph may decrease.

For example, when the battery charge state reaches the upper limit of battery charge state, the battery overcharge protection logic is activated, and at the instant time, regenerative braking is turned off, and regenerative braking is immediately stopped. In the instant case, there is a problem that the vehicle speed kph may increase, and the present disclosure is provided to prevent the present problem.

Figure 13:
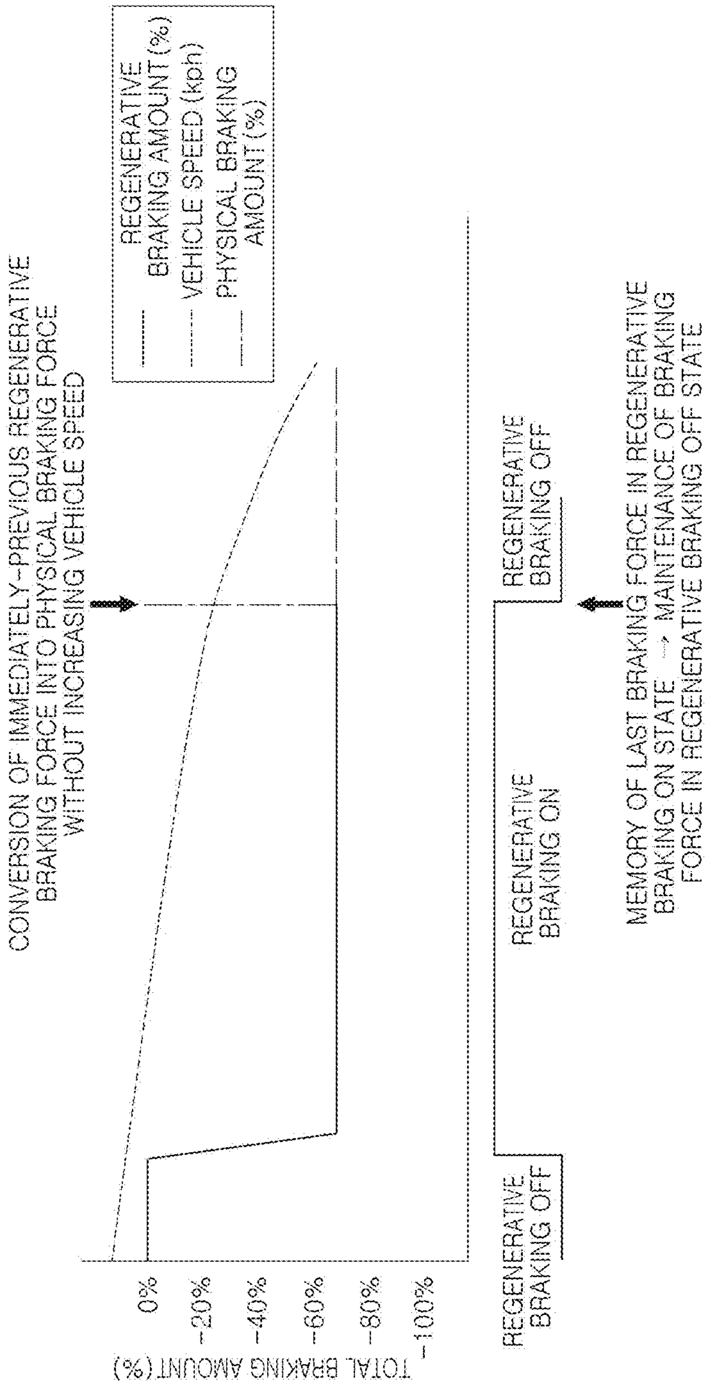
FIG. 13 is an explanatory diagram of regenerative braking amount, vehicle speed, and physical braking amount according to regenerative braking on or off when an exemplary embodiment of the present disclosure is applied.

FIG. 13 is an explanatory diagram of the regenerative braking amount, vehicle speed, and physical braking amount according to regenerative braking on or off when the present disclosure is applied.

Referring to FIG. 13, when the present disclosure is applied, the amount of regenerative braking immediately increases when regenerative braking is turned on and the vehicle speed kph may gradually decrease.

Thereafter, the device 50 for controlling vehicle braking according to an exemplary embodiment of the present disclosure remembers the last braking force in the regenerative braking ON state, and in the regenerative braking OFF state, the vehicle speed does not increase, and this is because the braking force may be maintained by converting the immediately-previous regenerative braking force into physical braking force.

Figure 14:
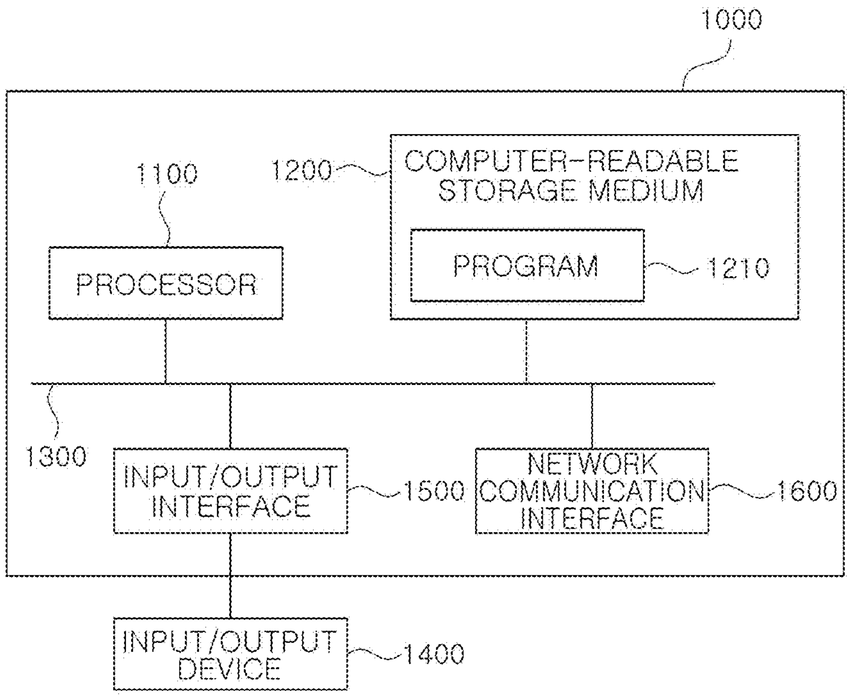
FIG. 14 is a block diagram of a computing device which may fully or partially implement a device and method for controlling vehicle braking according to an exemplary embodiment of the present disclosure.

FIG. 14 is a block diagram of a computing device which may fully or partially implement a device and method for controlling vehicle braking according to an exemplary embodiment of the present disclosure.

The processor 1100 may enable the computing device 1000 to operate according to the above-mentioned example embodiments. For example, the processor 1100 may execute one or more programs stored in the computer-readable non-transitory storage medium 1200. The one or more programs may include one or more computer executable instructions, and the computer-executable instructions may be configured to enable the computing device 1000 to execute operations according to exemplary embodiments of the present disclosure, when executed by the processor 1100.

The computer-readable storage medium 1200 is configured to store computer-executable instructions or program code, program data, and/or other suitable forms of information. The program 1210 stored in the computer-readable storage medium 1200 includes a set of instructions executable by the processor 1100. In an exemplary embodiment of the present disclosure, the computer-readable storage medium 1200 may be a memory (a volatile memory, such as random access memory, a non-volatile memory, or an appropriate combination thereof), one or more magnetic disk storage devices, optical disk storage devices, flash memory devices, other types of storage media that may be accessed by the computing device 1000 and store required information, or a suitable combination thereof.

The communication bus 1300 interconnects various other components of computing device 1000, including processor 1100 and computer-readable storage medium 1200.

The computing device 1000 may also include one or more input/output interfaces 1500 and one or more network communication interfaces 1600 that provide an interface for one or more input/output devices 1400. The input/output interface 1500 and the network communication interface 1600 are connected to the communication bus 1300. The network may be any one of cellular networks such as Global System for Mobile Communications (GSM), Enhanced Data Rates for GSM Evolution (EDGE), General Packet Radio Service (GPRS), Code Division Multiple Access (CDMA), Time Division-CDMA (TD-CDMA), Universal Mobile Telecommunications System (UMTS), Long Term Evolution (LTE), or other cellular networks.

The input/output device 1400 may be connected to other components of the computing device 1000 through the input/output interface 1500. Examples of the input/output device 1400 may include a pointing device (such as a mouse or trackpad), keyboard, touch input device (such as a touchpad or touchscreen), or voice or sound input device, input devices such as various types of sensor devices and/or imaging devices, and/or output devices such as display devices, printers, speakers, and/or network cards. The illustrative input/output device 1400 may be included within the computing device 1000 as a component forming the computing device 1000, or may be connected to the computing device 1000 as a separate device distinct from the computing device 1000.

Meanwhile, in embodiments of the present disclosure, a program for performing the methods described in the present specification on a computer, and a non-transitory computer-readable recording medium including the program, may be included. The non-transitory computer-readable recording medium may include program instructions, local data files, local data structures, and the like, singly or in combination. The media may be those designed and constructed for the present disclosure, or may be those commonly available in the computer software field. Examples of computer-readable recording media may include magnetic media such as hard disks, floppy disks, and magnetic tapes, optical recording media such as CD-ROM and DVD, a specially configured hardware device to store and perform program instructions, such as ROM, RAM, flash memory, and the like. Examples of the programs may include not only machine language code such as that produced by a compiler, but also high-level language code which may be executed by a computer using an interpreter or the like.

As set forth above, according to various exemplary embodiments of the present disclosure, when regenerative braking is forcibly stopped to prevent overcharging of a vehicle, an effect of maintaining braking force even if regenerative braking is stopped may be provided.

In detail, even when regenerative braking is forcibly stopped while a vehicle is traveling downhill, acceleration due to a pedal value may be prevented by setting the pedal value to a zero value, and the regenerative braking force is converted into physical braking force, and the braking force may be maintained. Accordingly, vehicle acceleration due to interruption of regenerative braking may be prevented, ensuring stable operation.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

Software implementations may include software components (or elements), object-oriented software components, class components, task components, processes, functions, attributes, procedures, subroutines, program code segments, drivers, firmware, microcode, data, database, data structures, tables, arrays, and variables. The software, data, and the like may be stored in memory and executed by a processor. The memory or processor may employ a variety of means well-known to a person including ordinary knowledge in the art.

Furthermore, the terms such as “unit”, “module”, etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, a plurality of operations may be merged, or any operation may be divided, and a predetermined operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In exemplary embodiments of the present disclosure, “at least one of A and B” may refer to “at least one of A or B” or “at least one of combinations of at least one of A and B”. Furthermore, “one or more of A and B” may refer to “one or more of A or B” or “one or more of combinations of one or more of A and B”.

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for controlling vehicle braking, the apparatus comprising:

a processor; and a non-transitory computer-readable storage medium storing instructions that, when executed by the processor, cause the processor to:

forcibly stop regenerative braking of a vehicle in response to a battery charge state of the vehicle reaching a battery upper limit charge state during the regenerative braking;

generate a trigger signal in response to the vehicle is being driven while the regenerative braking is forcibly stopped; and initiate an operation according to the trigger signal, obtain a converted braking force value based on a regenerative braking force value obtained from a total braking force value of the vehicle before the forced stopping of the regenerative braking, and determine a target physical braking force using the converted braking force value.

2. The apparatus of claim 1, wherein the instructions further cause the processor to obtain the regenerative braking force value from the total braking force value of the vehicle before the forced stopping of the regenerative braking, based on a regenerative braking type before the forced stopping of the regenerative braking, to reflect the regenerative braking force value in the target physical braking force.

3. The apparatus of claim 2, wherein the instructions further cause the processor to recognize which mode the regenerative braking type is, from among a regenerative braking single mode in which the vehicle is only in a regenerative braking state, a first common mode in which the regenerative braking and physical braking are used together, and a second common mode with cruise braking.

4. The apparatus of claim 3, wherein the instructions further cause the processor to obtain the regenerative braking force value before the forced stopping of the regenerative braking based on preset regenerative braking amount distribution ratio information in response to the regenerative braking type being one of the first common mode and the second common mode.

5. The apparatus of claim 4, wherein the instructions further cause the processor to perform proportional integral control on the regenerative braking force value, for reflection in the target physical braking force.

6. The apparatus of claim 2, wherein the instructions further cause the processor to determine a braking force correction value based on an attitude, a weight and deceleration of the vehicle, for reflection in the target physical braking force.

7. The apparatus of claim 6, wherein the instructions further cause the processor to obtain the converted braking force value using the regenerative braking force value and the braking force correction value and determining the target physical braking force based on the converted braking force value.

8. The apparatus of claim 6, wherein the instructions further cause the processor to obtain an auxiliary braking force value based on the total braking force value of the vehicle before the forced stopping of the regenerative braking to reflect the auxiliary braking force value in the target physical braking force, in response to auxiliary braking being used before the forced stopping of the regenerative braking.

9. The apparatus of claim 6, wherein the instructions further cause the processor to set a driver pedal value to a zero value to prevent physical acceleration due to the driver pedal value in response that the driver pedal value before the forced stopping of the regenerative braking exceeds the zero value.

10. The apparatus of claim 8, wherein the instructions further cause the processor to obtain the auxiliary braking force value to reflect the auxiliary braking force value in the target physical braking force, based on ratio information of an auxiliary braking amount to the total braking force value of the vehicle before the forced stopping of the regenerative braking.

11. A method for controlling vehicle braking, the method including:

a regenerative braking stop operation of forcibly stopping, by a processor, regenerative braking of a vehicle in response to a battery state of the vehicle reaching a battery upper limit charge state, during regenerative braking of the vehicle;

a trigger signal generation operation of generating, by the processor, a trigger signal in response to the vehicle being driven while the regenerative braking is forcibly stopped; and a target braking force determination operation of initiating, by the processor, operation according to the trigger signal, obtaining a converted braking force value based on a regenerative braking force value obtained from a total braking force value of the vehicle before the forced stopping of the regenerative braking, and determining a target physical braking force using the converted braking force value.

12. The method of claim 11, wherein the target braking force determination operation further includes a regenerative braking force determination operation of obtaining the regenerative braking force value from the total braking force value of the vehicle before the forced stopping of the regenerative braking, based on a regenerative braking type before the forced stopping of the regenerative braking, to reflect the regenerative braking force value in the target physical braking force.

13. The method of claim 12, wherein the target braking force determination operation further includes a first correction value determination operation of determining a braking force correction value based on an attitude, a weight and deceleration of the vehicle to reflect the braking force correction value in the target physical braking force.

14. The method of claim 13, wherein the target braking force determination operation further includes a target physical braking force determination operation of determining the converted braking force value using the regenerative braking force value and the braking force correction value, and determining the target physical braking force based on the converted braking force value.

15. The method of claim 14, wherein the regenerative braking force determination operation further includes a regenerative braking type recognition operation of recognizing which mode the regenerative braking type is, from among a regenerative braking single mode in which the vehicle is in a regenerative braking state, a first common mode in which regenerative braking and physical braking are used together, and a second common mode in a cruise braking state.

16. The method of claim 15, wherein the regenerative braking force determination operation further includes a regenerative braking force value acquisition operation of obtaining the regenerative braking force value before the forced stopping of the regenerative braking based on preset regenerative braking amount distribution ratio information, in response to the regenerative braking type being one of the first common mode and the second common mode.

17. The method of claim 16, wherein the regenerative braking force determination operation further includes a proportional integral control operation of performing proportional integral control on the regenerative braking force value, for reflection in the target physical braking force.

18. The method of claim 14, wherein the target braking force determination operation further includes a second correction value determination operation of obtaining an auxiliary braking force value based on the total braking force value of the vehicle before the forced stopping of the regenerative braking to reflect the auxiliary braking force value in the target physical braking force, in response to auxiliary braking being used before the forced stopping of the regenerative braking.

19. The method of claim 18, wherein the second correction value determination operation obtains the auxiliary braking force value to be reflected in the target physical braking force, based on ratio information of an auxiliary braking amount to the total braking force value of the vehicle before the forced stopping of the regenerative braking.

20. The method of claim 16, wherein the target braking force determination operation further includes a pedal logic operation of setting a driver pedal value to a zero value to prevent physical acceleration due to the driver pedal value in response to the driver pedal value before the forced stopping of the regenerative braking exceeding the zero value.

* * * * *